April 5, 1932. V. E. NELSON 1,852,472

PACKING RING

Filed Dec. 14, 1928

INVENTOR.
VICTOR E. NELSON

BY

ATTORNEY.

Patented Apr. 5, 1932

1,852,472

UNITED STATES PATENT OFFICE

VICTOR E. NELSON, OF PONTIAC, MICHIGAN, ASSIGNOR TO UNIVERSAL OIL SEAL COMPANY, OF PONTIAC, MICHIGAN, A CORPORATION OF MICHIGAN

PACKING RING

Application filed December 14, 1928. Serial No. 326,098.

REISSUED

This invention relates to packing rings for shafts, and the object of the invention is to provide a resilient or flexible packing that permits the shaft to float so far as the packing is concerned and yet prevents leakage of oil through the bearing along the shaft at all times.

A feature of the invention resides in its simplicity and inexpensiveness of construction avoiding the use of glands that require tightening to prevent oil leakage and automatically compensates for wear during the life of the packing.

These and other features and objects of the invention are hereinafter more fully described and the preferred form of construction of a packing ring embodying my invention is shown in the accompanying drawings in which—

Figure 1:
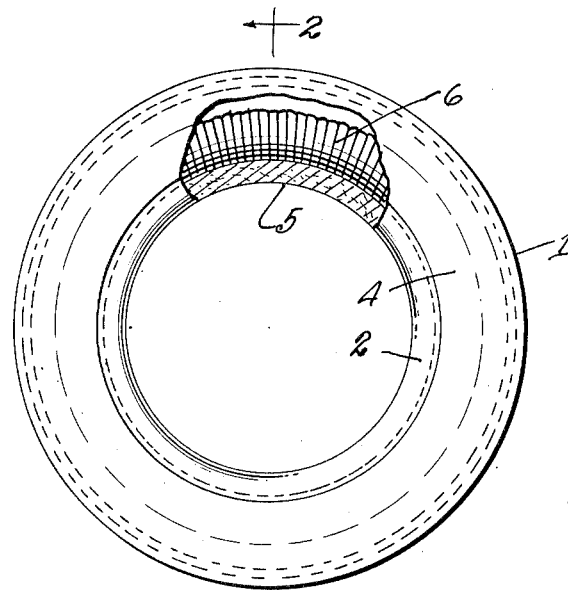
Fig. 1 is a elevation partly in section showing my improved packing ring.
Figure 2:
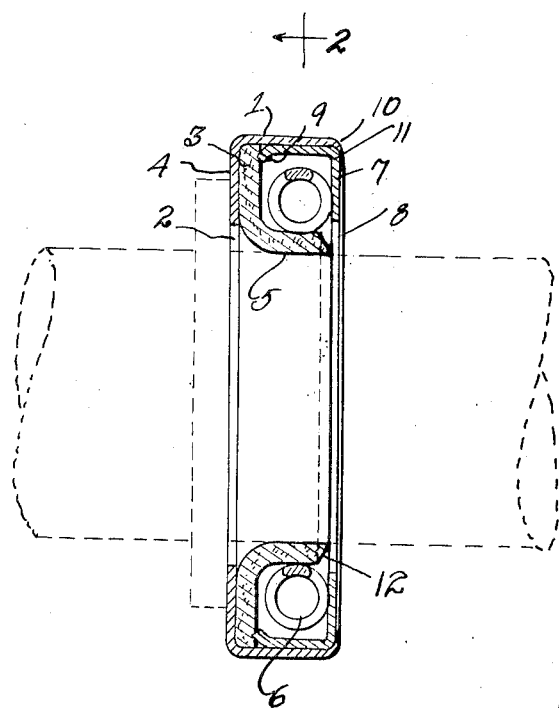
Fig. 2 is a section taken on line 2—2 of Fig. 1 and indicating the shaft in position therein.

This packing is designed to be stationarily positioned in the housing providing or supporting the bearing for the shaft as will be understood from Fig. 2 and it consists of a sheet metal case or shell 1 of ring like form and L shaped in cross section providing a central cylindrical opening 2 in the base 4.

On the base is positioned a packing element of leather or other desirable material 3 which is also of L shaped form the base of which rests upon the leg or base 4 of the case 1 and the other portion of which is turned outwardly substantially at a right angle thereto forming a cylindrical shaft contacting portion indicated at 5. A coiled spring 6 of the "garter" type is positioned about this cylindrical portion 5 of the packing member 3. This portion 5 of the packing under the action of the spring 6 has an internal diameter normally less than the diameter of the shaft.

The above enumerated parts are retained in their positions by an inner shell 7 of ring like form and L shaped in cross section having a cylindrical opening 8 approximately of the same diameter or slightly greater in diameter than the aperture 2 in the base portion of the shell 1. This member 7 at its inner edge is inturned as indicated at 9 so that in pressing the member 7 into the member 1 this edge 9 tightly engages the packing ring 3 at a little distance from the outer edge of its base portion and thus in pressing the L shaped members together there is no liability of the portion 9 engaging behind the peripheral edge of the packing ring or in other words by inturning this edge 9 it is certain to engage the packing ring and retain the same in the case.

Subsequent to the positioning of the member 7 in the member 1 the edge 10 of the outer shell or member 1 is spun or inturned over the outer edge 11 of the member 7 and in spinning this edge 10 over the inserted member 7 it is fixedly secured and engages the packing ring under pressure to embed the edge 9 in the leather 3.

The apertures 2 and 8 in the members 1 and 7 are greater in diameter than the diameter of the shaft with which the device is to be used and thus, as will be readily observed, the axis of the shaft may vary relative to the axis of the two metal members or rings 1 and 7. In other words, the shaft may float relative to these members and the cylindrical portion 5 of the packing element, which is held in contact with the shaft by the spring 6, will maintain a tight seal at this point at all times.

From the foregoing description it will be observed that the device is of extremely simple construction consisting merely of two cases or shells 1 and 7 of ring like form and L-shaped in cross section one telescoping within the other and providing a housing substantially rectangular in cross section for the spring 6 and, as the packing ring itself is fairly stiff yet flexible in character, the spring cannot accidentally become displaced. The structure therefore is inexpensive in character and is readily assembled by placing the same into the end or other portion on the housing supporting the shaft bearing and as the shaft may wear in the bearing and tend to oscillate this ring has sufficient flexibility as to permit the shaft to float relative to the packing ring case while the packing is always maintained tightly in contact with the shaft.

When the member 7 is positioned in the member 1 the edge 9 thereof is pressed into the leather 3 while the edge 10 of the member 1 is spun over the edge 11 of the member 7. This secures the member 3 firmly in place and prevents any possibility of oil leaking between the member 9 and the leather member 3. As will be noted from Fig. 2 the edge of the portion 5 of the leather packing member 3 is beveled at 12 and this bevel has a wiping action on the shaft preventing oil from passing along the shaft between the portion 5 of the leather packing and the shaft. By the clamping action on the leather member 3 it is firmly held in the casing at the outer edge so that any variation in the shaft such as whipping or the like, it will not pull the leather packing member loose from the casing.

Having thus briefly described my invention, its utility and mode of operation, what I claim and desire to secure by Letters Patent of the United States is—

1. A packing for shafts and the like comprising a casing U-shaped in cross section formed of an inner and an outer shell of ring like form and L-shaped in cross section and in telescopic relation providing a central aperture for the shaft, the outer shell having its peripheral flange inturned over the base of the inner shell to secure the parts together, a leather packing element L-shaped in cross section having a base portion extending between the inner and outer shells, the inner shell having the inner edge of its peripheral portion inturned and engaging the base of the packing element against the other flange of the outer shell and at a distance from the edge of the packing, a coiled spring of the garter type encircling the remaining portion of the packing element and free to float between the inner and outer shell and maintaining the engaged portion of the packing element in close engagement with the shaft.

2. A packing for shafts and the like comprising a ring like casing U shaped in cross section, said casing consisting of an outer and inner sheet metal shell L shaped in cross section and in telescopic relation providing a central opening therethrough for the shaft, an L shaped leather packing ring having a base part extending between the two shells, the inner shell having its peripheral wall inturned at its edge and the outer shell having its peripheral wall inturned at its edge over the base of the inner shell whereby the base of the leather packing at a distance from its peripheral edge is clamped between the said inturned edge of the inner shell and the base of the outer shell, the remaining portion of the packing element lying within the shell through which the shaft extends, and a contracting spring element engaging the said portion for holding the packing in engagement with the shaft.

3. A packing for shafts and the like comprising a casing formed of two telescoping sections of ring like form and L shaped in cross section, the peripheral flanges of the two parts lying in telescoping relation and the base portions thereof extending at a right angle to the shaft and providing an aperture through which the shaft extends, the edge of the flange of the inner shell being inturned, means for securing the two sections together, a leather packing element of ring like form having a base portion clamped in position at a distance from its peripheral edge by said inturned edge of the inner shell by the securing of the two sections together and further having a cylindrical portion thereof extending into the shaft opening for engagement with the shaft, a spring member of the garter type lying within the casing between the two sections free to float therein and tending to contract the portion of the packing lying within the shaft opening to maintain the packing in engagement with the shaft.

4. As an article of manufacture, a self-contained seal for insertion as an assembled unit within a tubular housing in encompassing relation to a centrally located shaft, consisting of two flat centrally apertured sheet metal cups which are slidably nested one within the other in inverted relation to form a hollow annulus, a flanged packing housed within said annulus and provided with a radially extending portion which is clamped at a distance from its peripheral edge between the bottom of the outer cup and the rim of the inner cup, and a narrow flange on the rim of the outer cup inturned over the bottom of the inner cup to clamp the parts together.

5. As an article of manufacture, a self-contained annular seal for insertion as an assembled unit in the annular space between an interiorly cylindrical outside member and a centrally arranged circular inside member to turn with one of said members and seal against the other when one is rotated, comprising two annular sheet metal cage members of L-shaped radial section which are slidably nested together in inverted relation to form between the radially extending walls thereof an annular groove, a spun-over edge on one of the cage members in locking engagement with the other, an annular packing member of L-shaped radial section disposed in said groove with the axially extending portion of the packing member projecting from the groove and the radially extending portion thereof clamped between the radially extending portion of one of the cage members and the axially extending portion of the other and a radially contracting spring engaging the axially extending packing.

6. As an article of manufacture, a self-contained seal for insertion as an assembled unit within a tubular housing in encompassing relation to a centrally located shaft, consisting of two flat centrally apertured sheet metal cups which are nested one within the other in inverted relation to form a hollow annulus, a flanged packing which is housed within said annulus and is provided with a radially extending portion which is clamped between the bottom of the outer cup and the rim of the inner cup, and a narrow inturned flange on the rim of the outer cup in engagement with the bottom of the inner cup, said inner cup having the packing-engaging portion thereof spaced inwardly from the encompassing portion of the outer cup.

7. As an article of manufacture, a self-contained seal for insertion as an assembled unit within a tubular housing in encompassing relation to a centrally located shaft, consisting of two flat centrally apertured sheet metal cups which are nested one within the other in inverted relation to form a hollow annulus, a flanged packing which is housed within said annulus and is provided with a radially extending portion which is clamped between the bottom of the outer cup and the rim of the inner cup, and a narrow inturned flange on the rim of the outer cup in engagement with the bottom of the inner cup, said inner cup rim being disposed with the edge thereof in engagement with the radially extending portion of the packing in appreciably spaced relation to the encompassing wall of the outer cup.

In testimony whereof I sign this specification.

VICTOR E. NELSON.